United States Patent
Makhijani et al.

(10) Patent No.: US 10,250,717 B2
(45) Date of Patent: Apr. 2, 2019

(54) SCALING CLOUD RENDEZVOUS POINTS IN A HIERARCHICAL AND DISTRIBUTED MANNER

(71) Applicant: Futurewei Technologies, Inc., Plano, TX (US)

(72) Inventors: Kiran Makhijani, Los Gatos, CA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/171,745

(22) Filed: Oct. 26, 2018

(65) Prior Publication Data
US 2019/0068754 A1 Feb. 28, 2019

Related U.S. Application Data

(62) Division of application No. 14/941,292, filed on Nov. 13, 2015, now Pat. No. 10,116,767.

(51) Int. Cl.
*H04L 29/08* (2006.01)
*H04L 29/06* (2006.01)
(Continued)

(52) U.S. Cl.
CPC ........ *H04L 67/327* (2013.01); *G06F 9/45558* (2013.01); *H04L 45/00* (2013.01);
(Continued)

(58) Field of Classification Search
CPC ....... G06F 9/45558; G06F 2009/45595; H04L 67/10; H04L 67/327; H04L 45/00; H04L 65/4076
See application file for complete search history.

(56) References Cited

U.S. PATENT DOCUMENTS 6,975,581 B1 * 12/2005 Medina ............... H04L 12/4641
370/390
7,548,541 B2 * 6/2009 Ishwar .................. H04L 12/467
370/390
(Continued)

FOREIGN PATENT DOCUMENTS

CN 103632570 A 3/2014
CN 104202264 A 12/2014
CN 104392175 A 3/2015

OTHER PUBLICATIONS

Fenner, B., Ed., et al., "Multicast Source Discovery Protocol (MSDP)," RFC 3618, Oct. 2003, 19 pages.
(Continued)

*Primary Examiner* — Abdullahi E Sald
(74) *Attorney, Agent, or Firm* — Conley Rose, P.C.

(57) ABSTRACT

A method implemented in an inter-provider cloud rendezvous point (CRP-IP). The method includes receiving, via a receiver of the CRP-IP, a Register request from a first service provider cloud rendezvous point (CRP-SP) in a first service provider (SP) network domain, the Register request indicating a first portion of a virtual extensible network (VXN) with a global scope is hosted by the first SP network domain; and transmitting, via a transmitter of the CRP-IP, a Report message to a second CRP-SP in a second SP network domain hosting a second portion of the VXN, the Report message indicating the first portion of the VXN is hosted by the first SP network domain.

10 Claims, 11 Drawing Sheets

(51) Int. Cl.
*G06F 9/455* (2018.01)
*H04L 12/701* (2013.01)

(52) U.S. Cl.
CPC .......... *H04L 65/4076* (2013.01); *H04L 67/10* (2013.01); *G06F 2009/45595* (2013.01)

(56) References Cited

U.S. PATENT DOCUMENTS

| | | | | |
|---|---|---|---|---|
| 2013/0114465 | A1* | 5/2013 | McGovern | H04L 41/12 370/254 |
| 2013/0219384 | A1* | 8/2013 | Srinivasan | G06F 9/45558 718/1 |
| 2014/0325038 | A1* | 10/2014 | Kis | H04L 41/0803 709/220 |
| 2014/0355450 | A1* | 12/2014 | Bhikkaji | H04L 47/125 370/237 |
| 2015/0009992 | A1* | 1/2015 | Zhang | H04L 49/354 370/392 |
| 2016/0149808 | A1* | 5/2016 | Cai | H04L 12/4633 370/395.53 |
| 2016/0323184 | A1* | 11/2016 | Li | H04L 12/28 |
| 2016/0359720 | A1* | 12/2016 | Li | H04L 45/02 |

OTHER PUBLICATIONS

Bates, T., et al., "BGP Route Reflection: An Alternative to Full Mesh Internal BGP (IBGP)," RFC 4456, Apr. 2006, 11 pages.
Park, J., "Understanding the Impact of Internal BGP Route Reflection," 2011, 131 pages.
Foreign Communication From a Counterpart Application, PCT Application No. PCT/CN2016/105527, International Search Report dated Jan. 26, 2017, 4 pages.
Foreign Communication From a Counterpart Application, European Application No. 16863695.9, Partial Supplementary European Search Report dated Oct. 10, 2018, 13 pages.
Office Action dated Mar. 7, 2018, 8 pages, U.S. Appl. No. 14/941,292, filed Nov. 13, 2015.
Notice of Allowance dated Jun. 28, 2018, 18 pages, U.S. Appl. No. 14/941,292, filed Nov. 13, 2015.
Machine Translation and Abstract of Chinese Publication No. CN103632570, Mar. 12, 2014, 12 pages.
Machine Translation and Abstract of Chinese Publication No. CN104202264, Dec. 10, 2014, 16 pages.
Machine Translation and Abstract of Chinese Publication No. CN104392175, Mar. 4, 2015, 16 pages.

* cited by examiner

SCALING CLOUD RENDEZVOUS POINTS IN A HIERARCHICAL AND DISTRIBUTED MANNER

CROSS-REFERENCE TO RELATED APPLICATIONS

This patent application is a divisional of co-pending U.S. patent application Ser. No. 14/941,292, filed Nov. 13, 2015, by Kiran Makhijani, et al., and entitled "Scaling Cloud Rendezvous Points In A Hierarchical And Distributed Manner," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloudcasting is an emerging network routing and forwarding technology that enables devices connected to the same cloud to communicate with each other, where the cloud may be built over a networking infrastructure that is shared among multiple clouds. Cloudcasting provides mechanisms and protocols for intra-virtualized-network and/or inter-virtualized-network communications. The design goal for cloudcasting is to employ a single and unified methodology to control multi-tenancy datacenter, inter-datacenter communication, and hybrid-cloud interconnect.

SUMMARY

In an embodiment, the disclosure includes a method implemented in an inter-provider cloud rendezvous point (CRP-IP). The method includes receiving, via a receiver of the CRP-IP, a Register request from a first service provider cloud rendezvous point (CRP-SP) in a first service provider (SP) network domain, the Register request indicating a first portion of a virtual extensible network (VXN) with a global scope is hosted by the first SP network domain; and transmitting, via a transmitter of the CRP-IP, a Report message to a second CRP-SP in a second SP network domain hosting a second portion of the VXN, the Report message indicating the first portion of the VXN is hosted by the first SP network domain.

In another embodiment, the disclosure includes a method implemented in a first site cloud rendezvous point (CRP Site) in a fixed cloud rendezvous point (CRP) hierarchy. The method includes receiving, via a receiver of the first CRP Site, a first Register request from a first Cloud Switch Point (CSP) in a first data center domain, the Register request indicating a first portion of a virtual extensible network (VXN) is hosted in the first data center domain; querying, via a transmitter of the first CRP Site, a resolution server to determine a scope of the VXN; and transmitting, via the transmitter, a second Register request to a service provider CRP (CRP-SP), the second Register request indicating the scope of the VXN and indicating the first CRP Site as an originator of the second Register request.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
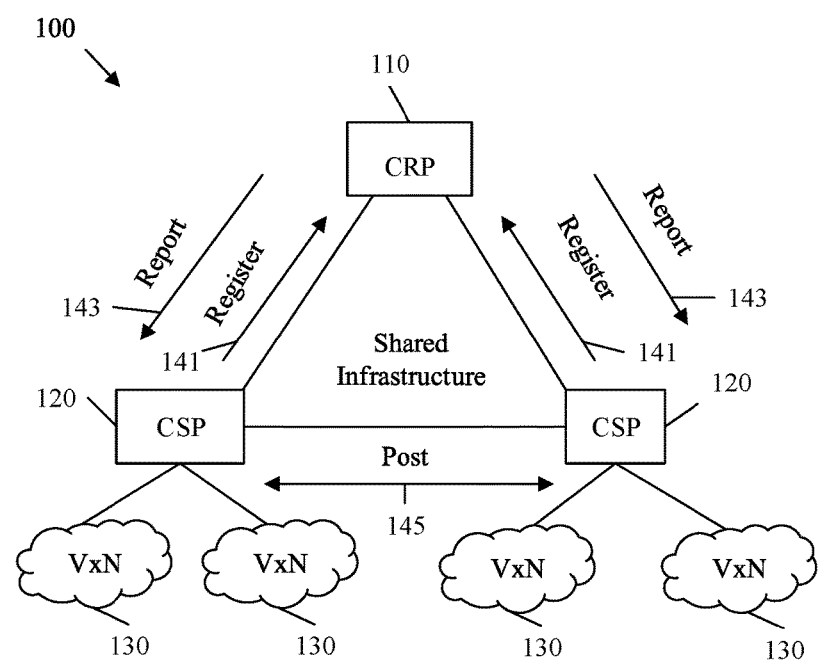
FIG. 1 is a schematic diagrams of an embodiment of a Cloudcasting network configured to implement geographically diverse virtual networks.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Virtual Machines (VMs) and/or other virtual resources can be linked together to form a virtual network, such as a VXN. Virtual networks support connectivity of physical servers in the same network domain or across a plurality of network domains. As virtual resources are often moved between servers, between geographically distant data centers (DCs), and/or distinct hosting companies, maintaining connectivity between the virtual resources in the virtual network can be problematic. Connectivity issues may further arise in cases where virtual networks communicate across portions of a core network controlled by multiple service providers. For example, hosts and/or providers limit sharing of data with other hosts/providers for security reasons. A Cloudcasting Control (CCC) protocol and associated Cloudcasting architecture may be employed to manage communication of virtual network information between DCs across the core network. Each portion of a virtual network (e.g. operating in a single DC) attaches to a local CSP. Each CSP is reachable at a network address, such as an internet protocol (IP) address. When a new portion of a VXN is initialized, the local CSP communicates with a CRP to determine if the VXN is already operating in another remote DC attached to a remote CSP. The local CSP may then communicate directly with the remote CSP to effectuate direct communication between the local portion of the VXN and the remote portion of the VXN. CCC is discussed further in U.S. patent application Ser. No. 14/728,821, entitled "Distribution of Internal Routes For Virtual Networking" by Renwei Li, et. al., which is hereby incorporated by reference. Cloudcasting via a single CRP may scale poorly as because a single CRP may exhibit significant latency and/or become overwhelmed by an arbitrarily large group of CSPs. Further, a single CRP may respond less quickly to distant CSPs due to propagation delays associated with long distance message travel.

Disclosed herein is a CRP hierarchy and associated control protocols to support a scalable group of CSP distributed over a plurality of service providers, for example via the Internet. A three tiered fixed hierarchy is employed to manage VXNs by administrative scope, such as local, provider, or global. A CRP Site is coupled to each datacenter hosting a VXN. Each datacenter's VXNs are reachable via a CSP associated with the datacenter. The CRP Site maintains a data structure, such as a CCIB or other database, comprising addresses of each CSP used to reach any portion of a VXN hosted wholly (e.g. local) or partially by the CRP Site's data center. A CRP-SP is employed for each SP network. The CRP-SP maintains a data structure, such as a CCIB, comprising addresses of each CSP used to reach any portion of each VXN of global or provider scope that is hosted at least partially in the SP network. A CRP-IP and/or a CRP-IP cluster maintain global knowledge of all VXNs of global scope and associated CSPs in a data structure such as a CCIB. Upon creation of a VXN at a datacenter, a Register request is sent upstream from the data center toward the CRP-IP. The Register request may contain data indicating the VXN, an indication of the originating CRP-Site, and a scope. The Register request is forwarded upstream to reach the CRP of the associated scope, for example a CRP-IP for global scope, a CRP-SP for provider scope, and a CRP Site for local scope. Upon receiving a Register request, the CRP of the associated scope sends a Report message to each CSP associated with the VXN. The Report message contains data indicating the VXN, data indicating all CSPs used to reach the VXN, and data indicating all CRP-Site's associated with the VXN data centers. The Report message is forwarded downstream via the CRPs in the hierarchy to reach the associated VXN via the associated CSPs. Each portion of the VXN may then communicate directly with all other portions of the VXN via the CSPs by employing address information in the Report messages. In the case of a CRP-IP cluster, the CRP-IPs may share data via peer messages to ensure data for the VXNs is consistent across all CRP-IPs. Such peer messages may be broadcast in batches periodically and/or upon receipt of a relevant Register message.

FIG. 1 is a schematic diagrams of an embodiment of a Cloudcasting network 100 configured to implement geographically diverse virtual networks. The Cloudcasting network 100 comprises a plurality of VXNs 130 and CSPs 120, which operate on geographically diverse DCs coupled by shared network infrastructure. Each portion of a VXN 130 is reachable by transmitting messages to an IP address of an attached CSP 120. The CSPs 120 are coupled to a single CRP 110 operating in a core network. The Cloudcasting network 100 is administered by employing a CCC protocol.

The CSPs 120 transmit Register requests 141 upstream to the CRP 110 to register the VXNs 130 upon initialization. The CRP 110 receives all of the Register requests 141 and is aware of the IP addresses of the attached CSPs 120. The CRP 110 responds to the Register requests 141 with Report messages 143. The Report messages 143 contain, for each VXN 130, the IP addresses of each CSP 120 coupled to the associated VXN 130. Accordingly, any node in the VXN 130 can communicate with any other node in the VXN 130 by transmitting Post messages 145 directly to the CSP 120 attached to the destination node by employing the addresses in the Report messages 143. While functional, the Cloudcasting network 100 scales poorly as discussed with respect to FIG. 2.

Figure 2:
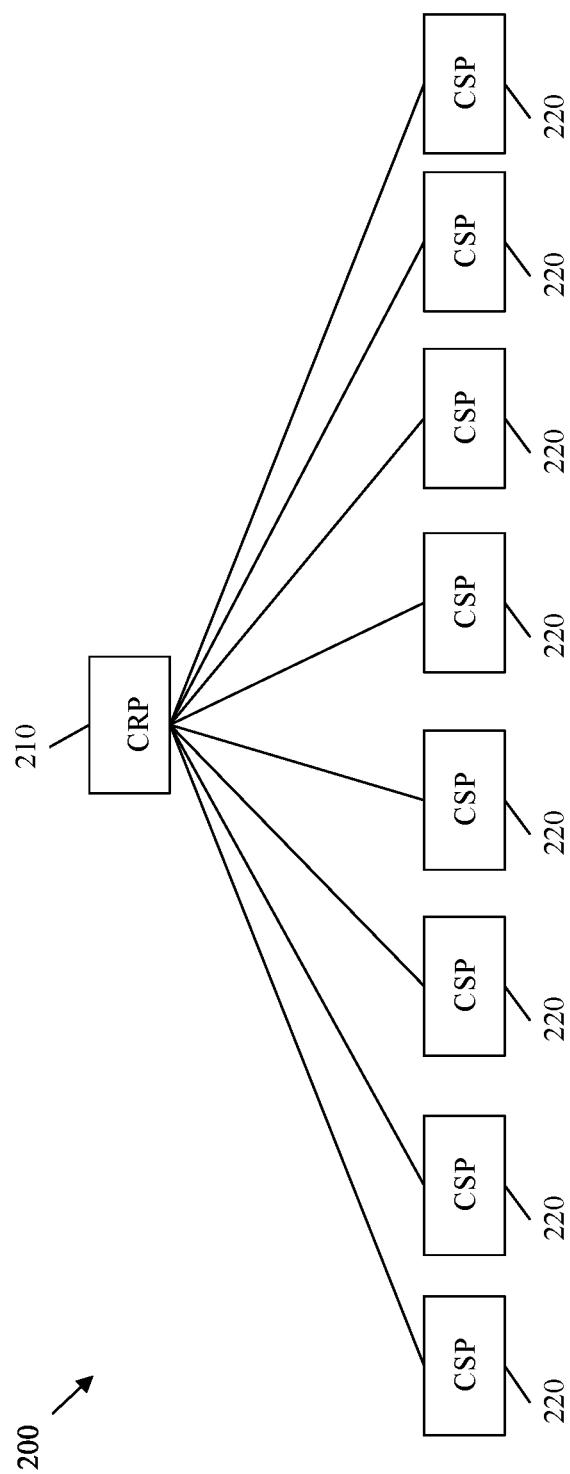
FIG. 2 is a schematic diagram of an embodiment of a flat control plane for a Cloudcasting network.

FIG. 2 is a schematic diagram of an embodiment of a flat control plane for a Cloudcasting network 200. Cloudcasting network 200 is substantially similar to Cloudcasting network 100, but comprises a plurality of CSPs 220 coupled to a single CRP 210, which may each be similar to CSPs 120 and CRP 110, respectively. As the number of CSPs 220 increase, the CRP 210 is required to maintain a progressively greater number of connection sessions with CSPs, to process progressively more Register requests, transmit progressively more Report messages, and employ progressively larger data structures to maintain routing information for every VXN attached to each CSP 120. As the number of CSPs 220 continue to increase/scale the response time of the CRP 210 must necessarily decrease, which creates a natural bottleneck for control message processing and therefore, increases the latency of VXN data communication channel setup between the portions of a VXN.

Figure 3:
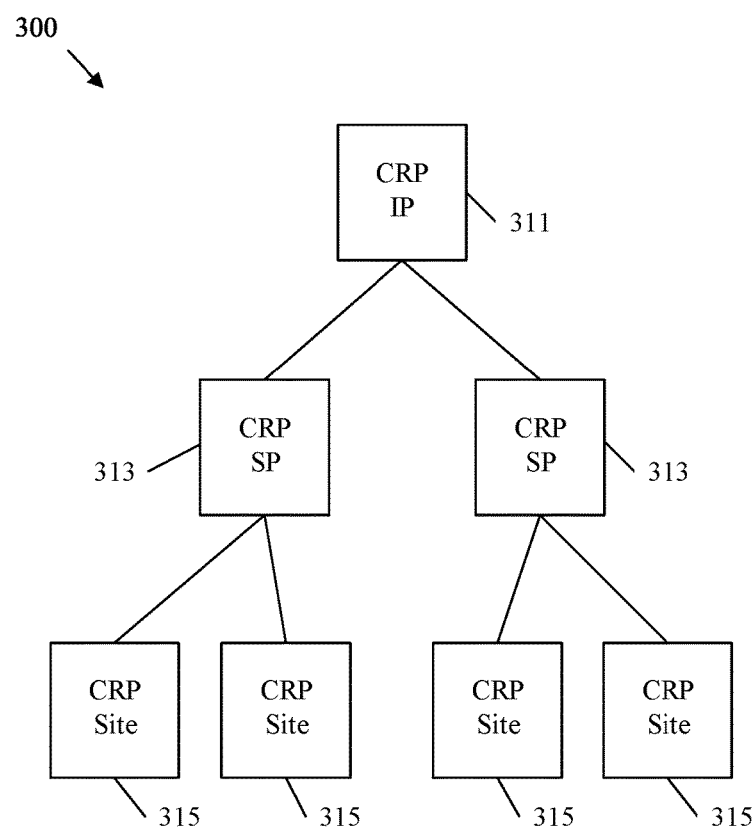
FIG. 3 is a schematic diagram of an embodiment of a hierarchical control plane for a Cloudcasting network.

FIG. 3 is a schematic diagram of an embodiment of a hierarchical control plane 300 for a Cloudcasting network. Control plane 300 solves the scalability issues of Cloudcasting networks 100 and 200. Control plane 300 comprises a fixed hierarchy of interconnected CRPs. Each VXN is configured with a scope of either local, provider, or global. VXNs of local scope may only be distributed in a single datacenter network domain (e.g. a single site). VXNs of provider scope may only be distributed inside a single SP's network domain. VXNs of global scope may be distributed globally across any number of SP network domains. Management of each VXN scope is distributed across the hierarchy of control plane 300.

Each data center is coupled to a CRP Site 315. Each CRP Site 315 is configured to maintain awareness of all CSP addresses for each VXN that is active on its local datacenter network domain. A CRP Site 315 is further configured to manage all control signaling for any local scope VXN on the CRP Site's 315 data center. However, each CRP Site 315 is unaware of local scope VXNs that are active in network 300 at remote datacenters. Each CRP Site 315 is also unaware of global and provider scope VXNs unless/until a virtual machine/element (e.g. portion) of such VXN becomes active at the CRP Site's 315 local datacenter. This configuration removes the need for a CRP Site 315 to manage information for non-relevant VXNs.

Each SP employs a CRP SP 313. The CRP SP 313 is configured to maintain awareness of all CSP addresses for each provider scope VXN operating in the SP network domain. The CRP SP 313 is also configured to manage all control signaling for associated provider scope networks. The CRP SP is further configured to maintain awareness of all CSP addresses for each global scope VXN with at least one virtual machine/element operating in the associated SP network domain. However, each CRP SP 313 is unaware of all local scope VXNs, is unaware of provider scope VXNs in remote SP network domains, and is unaware of global scope VXNs unless/until at least one virtual machine/element of the global scope VXN become active in the CRP SP's 313 local SP network domain. This configuration removes the need for a CRP SP 313 to manage information for non-relevant VXNs and VXNs being managed completely by the CRP Sites 315. It should be noted that, as used herein, the term remote shall mean non-local.

CRP IP 311 is configured to manage global scope VXNs that span multiple SP network domains. CRP IP 311 may be configured as a single device or as a CRP IP 311 cluster. The CRP IP 311 maintains awareness of all CSPs associated with any global scope VXN. The CRP IP 311 is also configured to manage control signaling for all global scope VXNs. However, the CRP IP 311 is unaware of any local scope or provider scope VXNs. This configuration removes the need for a CRP IP 311 to manage information for VXNs being managed completely by the CRP Sites 315 or the CRP SPs 313. As such, by employing the hierarchical control plane 300, CCC control is distributed across a plurality of CRPs with varying types of responsibility in a manner that naturally scales as more CSPs and data centers are added to the network. Further, no particular CRP node become overly burdened as more data centers and/or VXNs are added to the system. A full design of a Cloudcasting network employing a control plane similar to control plane 300 in a multi-provider context is discussed with reference to FIGS. 4A-4B along with a further description of each CRP and related hardware/software. It should be noted that while FIG. 3 depicts one CRP IP 311, two CRP SPs 313, and four CRP Sites 315, respectively, for clarity of discussion, any number of CRP IPs 311, CRP SPs 313, and/or CRP Sites 315, may be employed without departing from the scope of the present disclosure.

Figure 4A:
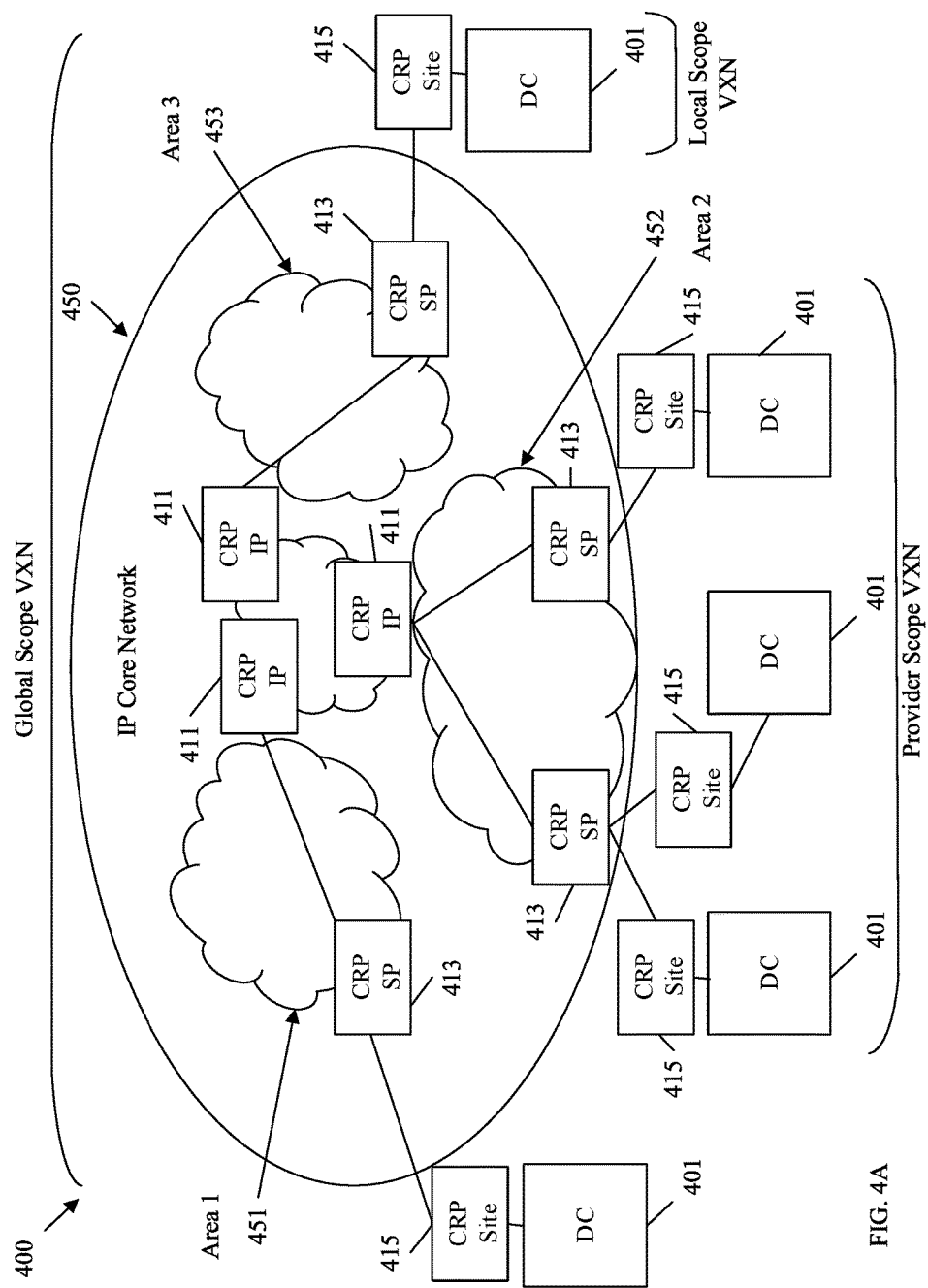
FIGS. 4A-4B are schematic diagrams of an embodiment of a hierarchical Cloudcasting network configured to operate across a plurality of SPs.
Figure 4B:
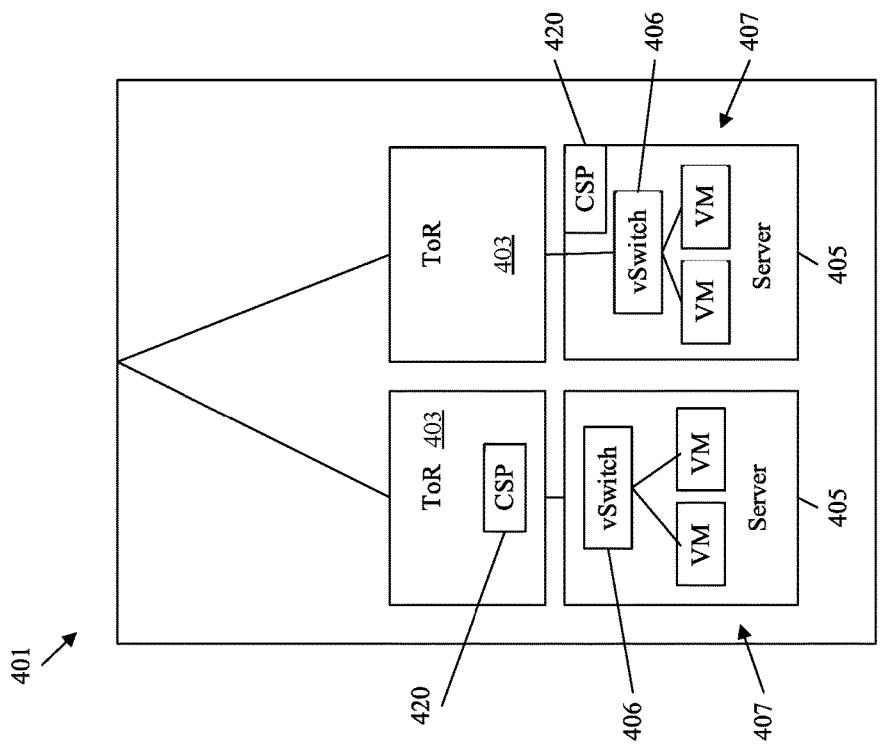

FIGS. 4A-4B are schematic diagrams of an embodiment of a hierarchical Cloudcasting network 400 configured to operate across a plurality of SPs. Hierarchical Cloudcasting network 400 may implement a control plane similar to control plane 300. Hierarchical Cloudcasting network 400 may comprises DCs 401 for operating virtual resources provisioned for a plurality of virtual networks. The DCs 401 are communicatively coupled via a IP core network 450. The IP core network 450 is partitioned in a plurality of areas, area 451, area 452, and area 453. The areas 451, 452, and 453 are each operated by a different SP and each comprise a plurality of physical nodes coupled by physical links. Communications between the virtual networks are facilitated by various edge routers and/or virtual switch (vSwitch) servers and other hardware and software components positioned in the core networks areas 451, 452, and/or 453.

Core network 450 provides routing and other telecommunication services for the DCs 401. Core network 450 may comprise high speed electrical, optical, elector-optical or other components to direct communications between the DCs 401. The core network 450 may be an IP based network and may employ an IP address system to locate source and destination nodes for communications (e.g. IP version four (IPv4) or IP version six (IPv6)). The core network 450 is divided into area 451, area 452, and area 453. Although three areas are depicted, it should be noted that any number of areas may be employed. Each area is operated by a different SP and comprises one or more SP network domains. Accordingly, information sharing may be controlled between areas for security reasons. Each area comprises nodes coupled by links. The nodes may be any optical, electrical, and/or elecro-optical component configured to receive, process, store, route, and/or forward data packets and/or otherwise create or modify a communication signal for transmission across the network. For example, nodes may comprise routers, switches, hubs, gateways, electro-optical converters, and/or other data communication device. Links may be any electrical and/or optical medium configured to propagate signals between the nodes. For example, links may comprise optical fiber, co-axial cable, telephone wires, Ethernet cables or any other transmission medium. In some embodiments, links may also comprise radio based links for wireless communication between nodes such as nodes. The core network 450 further comprises resolution server(s)/auto discovery systems configured to maintain addresses and/or scopes of various VXNs to support communication between DCs 401.

The hierarchical Cloudcasting network 400 further comprises CRP IPs 411, CRP SPs 413, and CRP Sites 415, which may be substantially similar to, and comprise the functionality of, CRP IPs 311, CRP SPs 313, and CRP Sites 315, respectively. The CRPs 411, 413, and 415 each comprise a CCIB. The CCIB is configured to maintain a table of all VXNs the CRP is aware of along with the IP addresses of all CSPs 420 associated with each known VXN. The CRPs further comprise processors, transmitters, and receivers to process, receive, and transmit, respectively, Report messages, Register requests, and/or any other control messages as discussed herein.

DCs 401 are any facilities for housing computer systems, power systems, storage systems, transmission systems, and/or any other telecommunication systems for processing and/or serving data to end users. DCs 401 may comprise servers, switches, routers, gateways, data storage systems, etc. DCs 401 may be geographically diverse for one another (e.g., positioned in different cities, states, countries, etc.) and couple across the core network 450 via one or more DC-Core network interfaces. Each DC 401 may maintain a local routing and/or security domain and may operate portions of one or more virtual networks such as VXNs and associated virtual resources, such as VMs. Referring to FIG. 4B, a DC 401 comprises a plurality of servers 405, which may be positioned in a rack. A rack may comprise a top of rack (ToR) switch 403 configured to route and/or switch transmissions between servers 405 in the rack. The DC 401 may further comprise end of row (EoR) switches configured to communicate with the ToR switches 403 and switch and/or route packets between rows of racks and the edges of the DC 401. The servers 405 may provide hardware resources for and/or implement any number of virtual resources for a virtual network.

The virtual network may comprise VMs 407 for processing, storing, and/or managing data for tenant applications. A VM 407 may be any operating system or application environment that emulates physical hardware. VMs 407 may be located by virtual Media Access Control (MAC) and/or virtual IP addresses. The virtual network may comprise vSwitches 406 configured to route packets to and from VMs 407 based on virtual IP and/or virtual MAC addresses. A vSwitch 406 may be any software switch logic that emulates a hardware switch. The vSwitches 406 may also maintain an awareness of a correlation between the virtual IP and virtual MAC addresses and the physical IP and MAC addresses of the servers 405 operating the VMs 407 at a specified time. The vSwitches 406 may be located on the servers 405. The vSwitches 406 may communicate with each other via CSPs 420, for example by employing layer two MAC routing.

The virtual networks may also comprise CSPs which may act as network virtual edges (NVEs) for each local portion of an associated virtual network. The CSPs 420 may be substantially similar to CSPs 120 and 220. The CSPs 420 maintain an awareness of the correlation between the virtual IP and virtual MAC addresses of the VMs 407 and the physical IP and MAC addresses of the servers 405 operating the VMs 407 at a specified time. The CSPs 420 may perform packet translation functions (e.g. layer 2 to layer 3), packet forwarding functions, security functions, and/or any other functions of a network edge device. The CSP 420 is configured to register, with the relevant CRP, any new associated VXN initialized on the DC 401 as well as receive any relevant Report messages. As such, any virtual network (e.g. VXN 130) and/or associated VM 407 operating in the DC 401 can be reached by transmitting a packet to the CSP 420 associated with the virtual network and/or VM 407. Further, any local VM 407 can communicate with any remote VM in a remote DC by transmitting a packet, such as a Post message, to the CSP 420 for retransmission to the remote DC. For example, the vSwitches 406 may broadcast packets over an associated virtual network via Open Systems Interconnection (OSI) layer two protocols (e.g., MAC routing), and CSP 420 may convert OSI layer two packets into OSI layer three packets (e.g., IP packets) for direct transmission to other CSPs 420 in the same or different DC 401, thus extending the layer two network over the layer three IP network. The CSPs 420 may be located in the ToRs 403, in the EoRs, in a border gateway, or in any other network node.

As discussed in more detail below, the CRP IPs 411, CRP SPs 413, and CRP Sites 415 are configured to communicate control messages, such as Register requests and Report messages with each other. The CRP Sites 415 are further configured to communicate such control messages with the CSPs 420. Specifically, the CRP IPs 411, CRP SPs 413, and CRP Sites 415 may act as rendezvous points for maintaining database tables for maintaining IP address information of DCs 401 and indications of virtual networks operating at each DC 401 at a specified time. The CRP IPs 411, CRP SPs 413, and CRP Sites 415 may report the IP address information and virtual network indications to the DCs 401 periodically, upon request, and/or upon the occurrence of an event (e.g. Register requests) to allow the DCs 401 to exchange virtual network routing information.

The control messages are employed to create and maintain virtual networks for varying scope. As shown in FIG. 4A, a local scope VXN spans a single DC 401 and associated CRP Site 415. As such, a local scope VXN can connect VMs operating in a common DC 401. Further, a provider scope VXN spans a group of DCs 401 controlled/coupled by a common provider, for example area 2 in FIG. 4A. As such, a provider scope VXN can connect VMs operating in any DC 401 controlled by and/or interconnected by the same service provider/operator. Finally, a global scope VXN is global and can connect VMs operating on any DC 401 coupled to the core network 450. It should be noted that while the local scope VXN is shown operating on one DC 401 and the provider scope VXN is shown operating on one area for purposes of clarity, the local scope VXN can operate in any single DC 401 and the provider scope VXN can operate in any single provider area.

Figure 5:
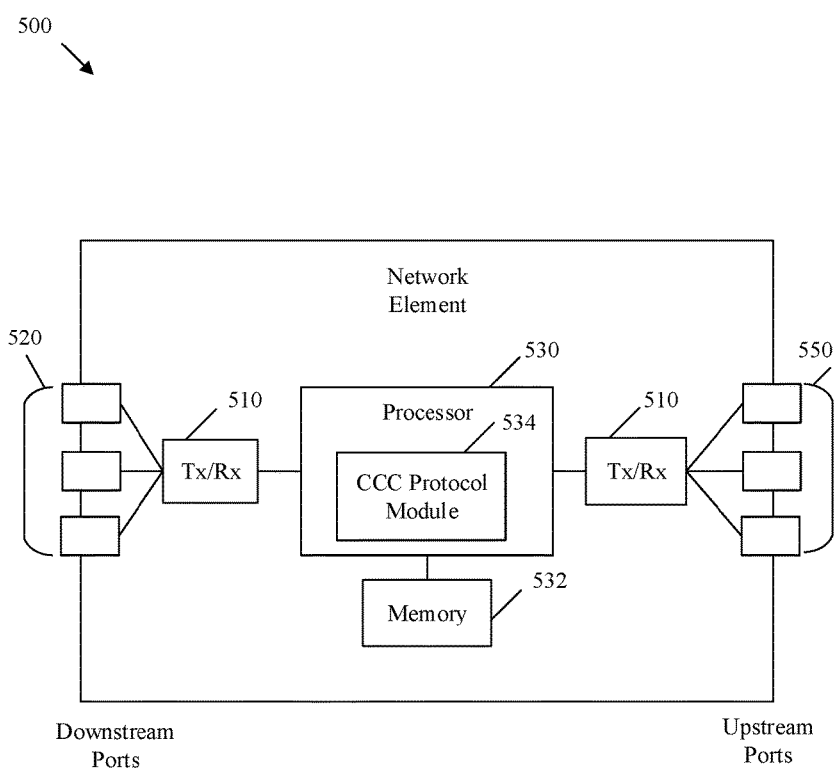
FIG. 5 is a schematic diagram of an embodiment of an NE configured to operate within a Cloudcasting network.

FIG. 5 is a schematic diagram of an embodiment of an NE 500 within a network, such as network 100 and/or 400, and/or control plane 200 and/or 300. For example, NE 300 may act as/implement a CRP 110, 210, 311, 313, 315, 411, 413, and/or 415, a CSP 120, 220, a ToR 403, a Server 405, and/or any other node in networks 100 and/or 400. NE 500 may also be any component configured to implement any virtual resource of a VXN 430. NE 500 may be implemented in a single node or the functionality of NE 500 may be implemented in a plurality of nodes. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features/methods described in the disclosure are implemented in a network apparatus or component such as an NE 500. For instance, the features/methods in the disclosure may be implemented using hardware, firmware, and/or software installed to run on hardware. The NE 500 is any device that transports frames through a network, e.g., a switch, router, bridge, server, a client, etc. As shown in FIG. 5, the NE 500 may comprise transceivers (Tx/Rx) 510, which are transmitters, receivers, or combinations thereof. A Tx/Rx 510 is coupled to a plurality of downstream ports 520 (e.g. downstream interfaces) for transmitting and/or receiving frames from other nodes and a Tx/Rx 510 coupled to a plurality of upstream ports 550 (e.g. upstream interfaces) for transmitting and/or receiving frames from other nodes, respectively. A processor 530 is coupled to the Tx/Rxs 510 to process the frames and/or determine which nodes to send frames to. The processor 530 may comprise one or more multi-core processors and/or memory 532 devices, which function as data stores, buffers, Random Access Memory (RAM), Read Only Memory (ROM), etc. Processor 530 may be implemented as a general processor or may be part of one or more application specific integrated circuits (ASICs) and/or digital signal processors (DSPs). Processor 530 comprises a CCC protocol module 534, which implements at least some of the methods discussed herein such as methods 800, 900, and/or 1000. In an alternative embodiment, the CCC protocol module 534 is implemented as instructions stored in memory 532, which are executed by processor 530, or implemented in part in the processor 530 and in part in the memory 532, for example a computer program product stored in a non-transitory memory that comprises instructions that are implemented by the processor 530. In another alternative embodiment, the CCC protocol module 534 is implemented on separate NEs. The downstream ports 520 and/or upstream ports 550 may contain electrical and/or optical transmitting and/or receiving components.

It is understood that by programming and/or loading executable instructions onto the NE 500, at least one of the processor 530, CCC protocol module 534, Tx/Rxs 510, memory 532, downstream ports 520, and/or upstream ports 550 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 6:
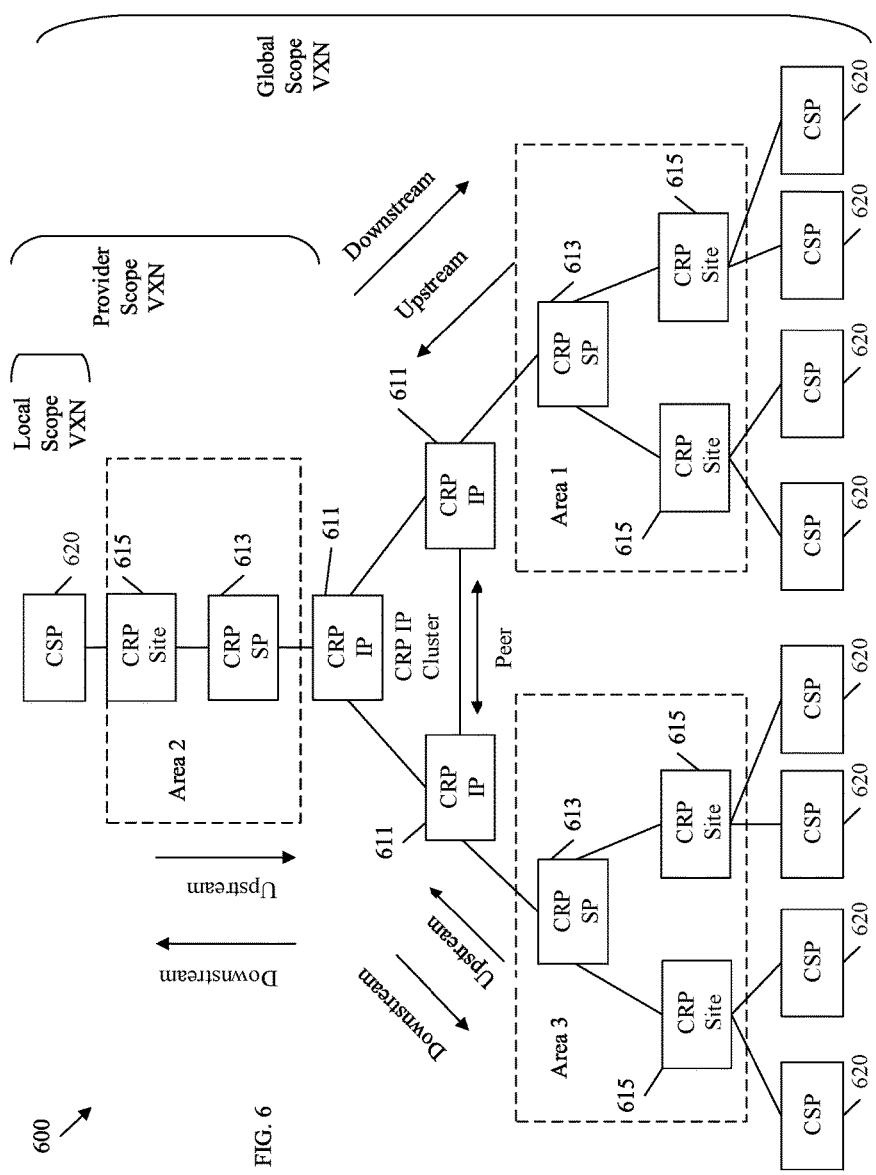
FIG. 6 is a schematic diagram illustrating an embodiment of a control messaging flow across a hierarchical Cloudcasting network.

FIG. 6 is a schematic diagram illustrating an embodiment of a control messaging flow across a hierarchical Cloudcasting network 600. Hierarchical Cloudcasting network 600 is substantially similar to hierarchical Cloudcasting network 400, but depicts a connection graph view for clarity. Hierarchical Cloudcasting network 600 comprises a CRP IP cluster of CRP IPs 611, CRP SPs 613, CRP Sites 615, and CSPs 620, which are substantially similar to CRP IP 411 nodes, CRP SPs 413, CRP Sites 415, and CSPs 420, respectively. As shown in FIG. 6, hierarchical Cloudcasting network 600 comprises three SP network domains (areas depicted in dashed lines) coupled to the central CRP SP cluster. Each area may comprise different IP addressing schemes. For example, the CRP IP 611 coupled to area 1, the CRP SP 613 of area 1, and the CRP Sites 615 of area 1 may comprise IP addresses such as 100.1.1.1, 10.1.1.1, 1.1.1.10, and 1.1.1.20, respectively. The CRP IP 611 coupled to area 2, the CRP SP 613 of area 2, and the CRP Site 615 of area 2 may comprise IP addresses such as 200.1.1.1, 20.1.1.1, and 2.1.1.10, respectively. The CRP IP 611 coupled to area 3, the CRP SP 613 of area 3, and the CRP Sites 615 of area 3 may comprise IP addresses such as 300.1.1.1, 30.1.1.1, 3.1.1.10, and 3.1.1.20, respectively. As such, each CRP node may be contacted by transmitting a packet to the associated IP address. The CSPs 620, CRP Sites 615, and CRP SPs 613 may transmit Register requests upstream toward the CRP IP cluster when a new VXN, or portion thereof, is initiated at a DC associated with a CSP 620. Further, the CRP IPs 611, CRP SPs 613, and CRP Sites 615 may transmit Report messages downstream toward the CSPs 620 to provide IP addresses of each CSP 620 related to a specified VXN so that each node in the VXN can communicate directly with all other nodes in the VXN by transmitting packets via the CSPs 620. The nodes of the CRP cluster may transmit peer/discovery messages among themselves in order to synchronize CCIBs so that report messages sent to each area are identical. It should be noted that Register requests are only transmitted upstream, while Report messages are only transmitted downstream, where upstream is the direction from the leaf nodes to the root nodes and downstream is the direction from the root nodes to the leaf nodes. For purposes of network 600, CRP IP 611 cluster nodes are root nodes, CRP Site 615 nodes are leaf nodes, and CRP SP 613 nodes are branch nodes, as membership in a VXN across multiple datacenters creates a tree graph rooted at the CRP IP 611 cluster with CRP Site 615 nodes as leaves. By employing one-way directionality of the Register requests and Report messages, no messaging loops are created. The Register requests and Report messages are discussed more fully below.

As noted herein, each CRP Site 615, CRP SP 613, and CRP IP 611 comprises a CCIB. Tables 1-2, 3-4, and 5-7 below show an example CCIB at a CRP Site 615, CRP SP 613, and CRP IP 611, respectively, based on the example IP addresses for network 600 shown above.

TABLE 1

CRP Site CCIB Downstream Table

| VXN | CSP descriptors | Remote VXN | scope |
|---|---|---|---|
| 100 | CSP 1, CSP 2 | 100 | local |
| 11 | CSP 4 (remote), CSP (local) | 11 | provider |
| 10 | CSP 10 (remote) CSP 1 (local) | 100 | global |
| 8 | CSP 1, CSP 3 | 100 | local |

TABLE 2

CRP Site CCIB Upstream Table
Provider CRP SP 1.1.1.1

As shown in tables 1-2, each CRP Site 615 maintains a downstream table in its local CCIB to indicate all VXN operating on its local datacenter, the scope of such VXNs, information indicating the CSPs 620 needed to reach such VXNs, and information indicating whether the relevant CSPs 620 are local to the datacenter or are in a remote datacenter. The CRP Site 615 further maintains an upstream table to indicate the IP address of the upstream CRP SP(s) 613.

TABLE 3

CRP SP CCIB Downstream Table

| VXN | Downstream CRP Sites | Scope |
|---|---|---|
| 10 | 1.1.1.10 1.1.1.20 | provider |
| 100 | 1.1.1.10 | Global |
| 11 | 1.1.1.20 | provider |

TABLE 4

CRP SP CCIB Upstream Table

| VXN | NextHop CRP IP node |
|---|---|
| 100 | 3.1.1.2 |
| 10 | 3.1.1.2 |
| 100 | 3.1.1.1 |

As shown in tables 3-4, each CRP SP 613 maintains a downstream table in its local CCIB to indicate all non-local scope VXNs operating on its SP network domain, the scope of such VXNs, and the IP addresses of the CRP Sites 615 for each such VXN. The CRP SP 613 further maintains an upstream table to indicate the IP address of the upstream CRP IP(s) 613 for each known VXN.

TABLE 5

CRP IP cluster CCIB Peer Table
Attached CRP IP 100.1.1.1
200.1.1.1
300.1.1.1

TABLE 6

CRP IP cluster CCIB Global Downstream Table

| VXN | CRP IP node | Next hop CRP SP |
|---|---|---|
| 100 | 100.1.1.1 | 10.1.1.1 |
|  | 200.1.1.1 | 20.1.1.1 |
| 200 | 300.1.1.1 | 30.1.1.1 |

TABLE 7

CRP IP cluster CCIB Local Downstream Table
Attached CRP SP

| |
|---|
| 30.1.1.1 |
| 30.1.1.2 |
| 30.1.1.3 |
| 30.1.1.4 |

As shown in tables 5-7, each CRP IP 611 node maintains a peer table in the CCIB to indicate the addresses of all other CRP IP 611 cluster nodes. The CRP IP 611 node maintains a global downstream table in the CCIB to indicate each global scope VXN, the CRP IP 611 nodes most closely connected to each portion of the VXN, and the next hope CRP SP 613 in the provider network for each portion of the VXN. Further, the CRP IP 611 node maintains a local downstream table in the CCIB to indicate the addresses of all other CRP SPs 613 in a domain bordering with the CRP IP 611.

Hierarchical cloudcasting network 600 further comprises local scope VXNs, provider scope VXNs, and global scope VXNs. A local scope VXN is addressable in a single DC, a provider scope is addressable in a single provider network area/domain, and a global scope VXN is addressable globally across the entire network. By employing the CCIBs in CRPs, each CSP can discover other CSPs in a remote DC operating a common VXN. Hence, each CSP can receive traffic for a local VM from a remote VM in a remote DC operating a common VXN. The traffic may be addressed using a virtual addressing scheme for the VXN and forwarded to the remote CSP coupled to the remote DC/provider network operating the same VXN, for example via IP tunneling as discussed in U.S. Provisional Application 62/154,164 by Renwei Li, et al., entitled "Generic Packet Encapsulation For Virtual Networking," which is incorporated by reference. The traffic may then be presented to the remote VM without the remote VM being aware it is not in the same DC as the local VM. Accordingly, traffic may be forwarded across VXNs according to their scope by employing the CCIBs created according to the control messaging disclosed herein. For local scope VXNs, CCIBs are populated by transmitting a Register message from a CSP 620 to a connected CRP Site 615, resulting in a corresponding Report message being sent from the CRP Site 615 back to the CSP(s) 620 associated with the VXN in the same data center. For provider scope VXNs, CCIBs are populated by transmitting a Register message from a CSP 620 to a CRP SP 613 via a connected CRP Site 615, resulting in a corresponding Report message being sent from the CRP SP 613 back to the CSP(s) 620 associated with the VXN in the same provider network as discussed more fully with respect to method 800 below. For global scope VXNs, CCIBs are populated by transmitting a Register message from a CSP 620 to a CRP IP 611 via a connected CRP Site 615 and a CSP SP 613, resulting in a corresponding Report message being sent from the CRP IP 611 back to all CSP(s) 620 associated with the VXN as discussed more fully with respect to method 900 below.

Figure 7:
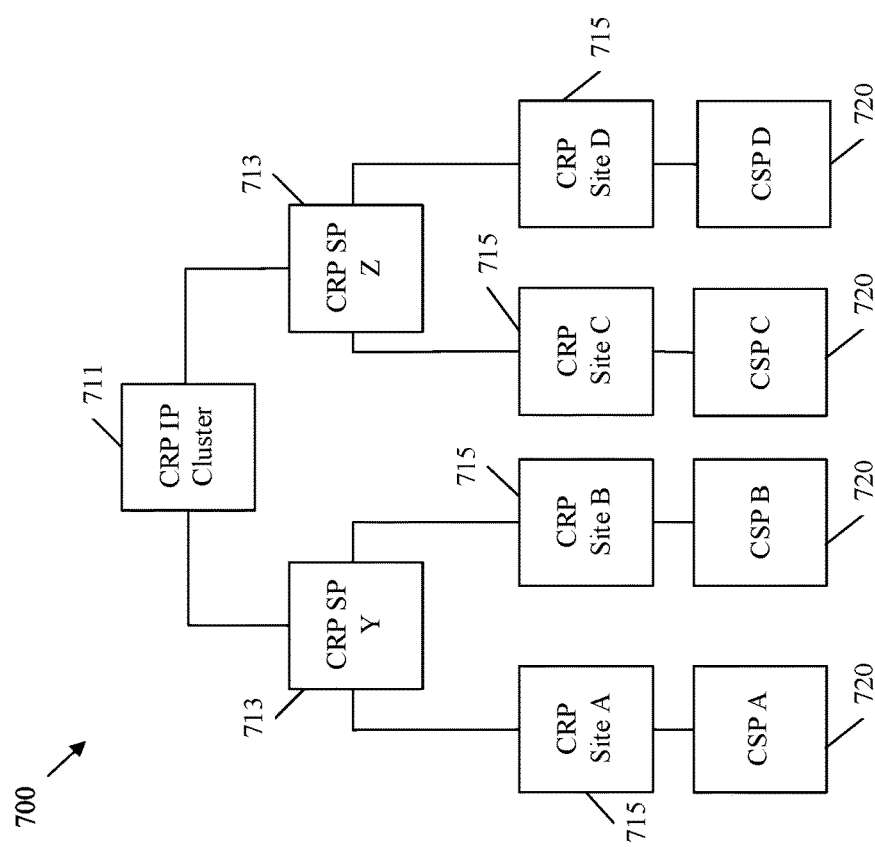
FIG. 7 is a schematic diagram of a simplified example hierarchical Cloudcasting network.

FIG. 7 is a schematic diagram of a simplified example hierarchical Cloudcasting network 700. Hierarchical Cloudcasting network 700 is substantially similar to control plane 300 and hierarchical Cloudcasting networks 400 and 600, but is presented in a simplified diagram for purposes of explanation. Specifically, hierarchical Cloudcasting network 700 comprises CRP IP cluster 711, CRP SPs 713, CRP Sites 715, and CSPs 720 which are substantially similar to corresponding nodes in control plane 300 and hierarchical Cloudcasting networks 400 and 600. Hierarchical Cloudcasting network 700 comprises CRP SP Y 713, CRP Site A 715, and CRP Site B in a first SP network domain (e.g. SP network domain Y). Hierarchical Cloudcasting network 700 further comprises CRP SP Z 713, CRP Site C 715, and CRP Site D in a second SP network domain (e.g. SP network domain Z). Hierarchical Cloudcasting network 700 further comprises CSP A 720, CSP B 720, CSP C 720, and CSP D 720, which are implemented in datacenters A, B C, and D, respectively. Hierarchical Cloudcasting network 700 is presented as an example network to clarify the components discussed with respect to methods 800, 900, and 1000 below.

Figure 8:
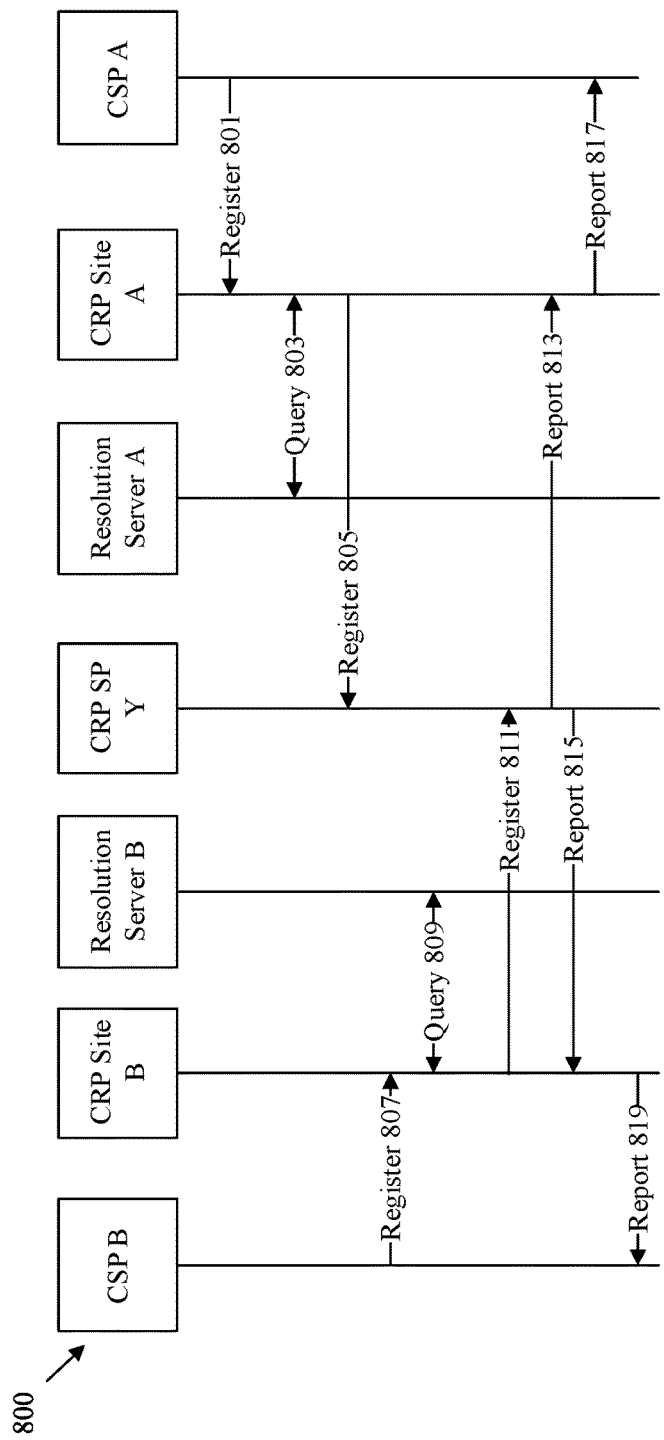
FIG. 8 is a protocol diagram of an embodiment of a method of control messaging across a hierarchical Cloudcasting network to create a provider scope VXN.

FIG. 8 is a protocol diagram of an embodiment of a method 800 of control messaging across a hierarchical Cloudcasting network to create a provider scope VXN. Method 800 is discussed with respect to hierarchical Cloudcasting network 700, but may also be employed with control plane 300, hierarchical Cloudcasting networks 400 and 600, and/or NE 500. Method 800 may be employed when a new VXN (or a locally new portion of an existing VXN) is initiated at a CSP. For example, the new VXN may be named VXN100 and may by initiated at a datacenter A that comprises CSP A. At step 801, CSP A transmits a Register request to CRP Site A. The Register request comprises an interest for routing information related to any other VMs related to VXN100 residing in remote datacenters, where a remote datacenter is any datacenter that does not share a network domain with the sending datacenter. At step 803, the CRP Site A transmits a query to a resolution server A in an auto-discovery system to determine the scope of VXN100 (e.g. local, provider, or global). It should be noted that resolution server A may reside in datacenter A or in the core network. The resolution server A may indicate that VXN100 is a provider scope network. As the network is of greater scope than local, the CRP Site must transmit a Register request upstream.

At step 805, CRP Site A updates its local CCIB and transmits Register request 805 to CRP SP Y register VXN100. The CRP Site A may add an Originating CRP Type Length Value (TLV), a CRP Role attribute, and/or a VXN Scope Attribute/TLV to the Register request 805. The Originating CRP TLV indicates the CRP acting as the source of the Register request (e.g. the CRP coupled to the datacenter housing the VXN), in this case CRP Site A. The CRP Role attribute indicates the role of the Originating CRP, in this case CRP Site A is acting as a CRP Site for VXN100. The VXN Scope attribute/TLV is included to indicate the scope of the VXN as either local, provider, or global, in this case provider. Upon receiving the Register request of step 805, the CRP SP Y stores the information relevant to VXN100 in its CCIB. The CRP SP Y may take no further action as VXN100 only resides in CSP A. Alternatively, the CRP SP Y may respond to CRP Site A/CSP A with an acknowledgement or a Report message indicating VXN100 is reachable by CSP A, which may indicate to the CRP Site A/CSP A that VXN100 is registered and is only operational at datacenter A. As VXN100 is provider scope, the CRP SP Y is aware that VXN100 cannot reside in the second SP domain. As such, the CRP SP Y does not forward the Register request further upstream to the CRP IP cluster.

At a later time, a VM or other portion of VXN100 is initialized in datacenter B. At step 807, a CSP B transmits a Register request to CRP site B in a manner similar to step 801. CRP Site B then queries a resolution server B at step 809 in a manner similar to step 803. It should be noted that Resolution servers A and B may be the same or different servers, depending on the embodiment. At step 811, the CRP Site B updates its local CCIB and sends a Register request to CRP SP Y indicating an interest in VXN100 of scope provider with the CRP Site B as the originating CRP and acting in the role of a CRP Site in a manner similar to step 805. Upon receiving Register request 811, the CRP SP Y updates the CCIB and becomes aware the VXN100 is active at both datacenter A and datacenter B. In response to updating the CCIB, the CRP SP Y determines to inform both CSPs (and intervening CRPs) of each other's IP address and the existence of a common VXN at both associated datacenters. At step 813, the CRP SP Y transmits a Report message to CRP Site A indicating VXN100 is reachable at both CSP B with CRP Site B acting as a CRP and at CSP A with CRP Site A acting as a CRP. At step 815, a Report message substantially similar to the Report message of step 813 is transmitted to CRP Site B. It should be noted that Report messages 815 and 813 may be sent sequentially or substantially simultaneously. At step 817, the CRP Site A may update its local CCIB and forward the Report message of step 813 toward CSP A. At step 819, the CRP Site B may update its local CCIB and forward the Report message of step 815 toward CSP B.

Upon completion of method 800, CSP A and CSP B may employ Post or similar messages to communicate directly (e.g. via tunneling or similar mechanisms) to allow a portion of VXN100 in datacenter A to communicate directly with a portion of VXN100 in datacenter B. From a user perspective, VXN100 may communicate as if part of the same network despite VXN100 being distributed across the SP network in geographically distant datacenters. As such, the Register requests and Report messages are transmitted, received, and processed to support direct communication over the VXN between data center domains via the CSPs.

Figure 9:
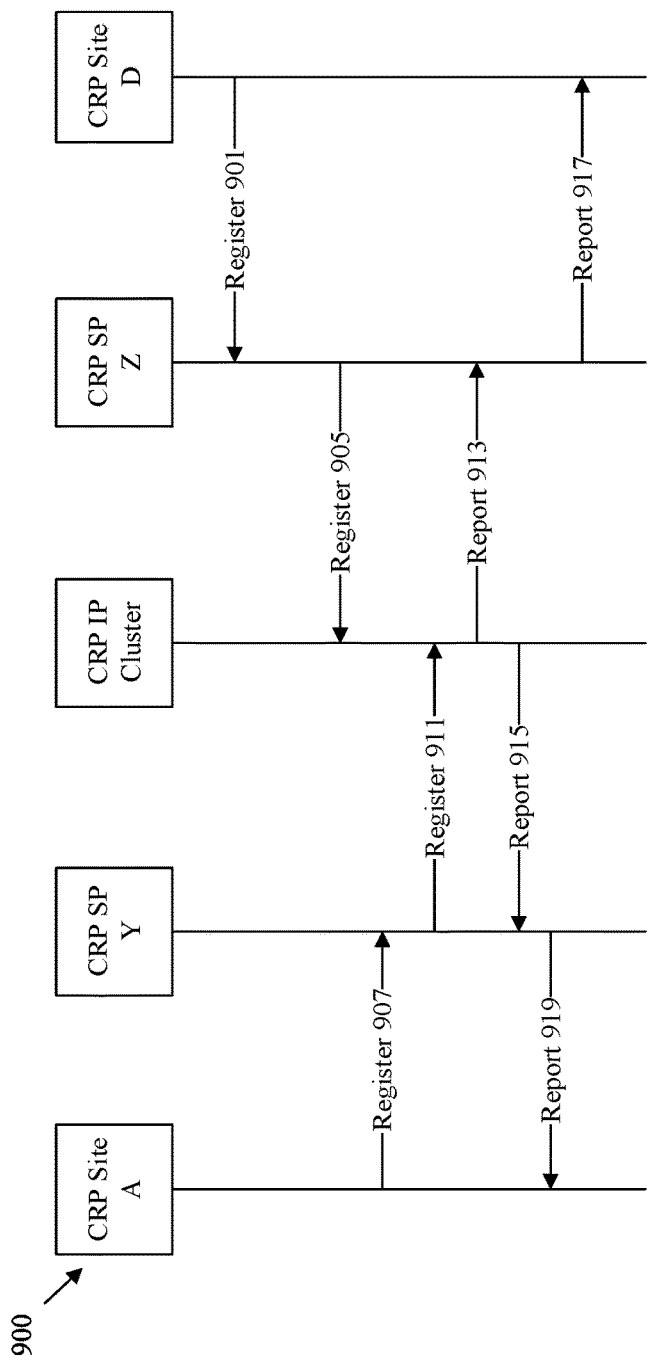
FIG. 9 is a protocol diagram of an embodiment of a method of control messaging across a hierarchical Cloudcasting network to create a global scope VXN.

FIG. 9 is a protocol diagram of an embodiment of a method 900 of control messaging across a hierarchical Cloudcasting network to create a global scope VXN. Method 900 is discussed with respect to hierarchical Cloudcasting network 700, but may also be employed with control plane 300, hierarchical Cloudcasting networks 400 and 600, and/or NE 500. Method 900 may be employed when a new VXN (or a locally new portion of an existing VXN) is initiated at a CSP. For example, the new VXN may be named VXN100 and may by initiated at a datacenter D that comprises CSP D in the second SP network domain. Method 900 may be similar to method 800, but indicates a process for managing global scope VXNs. The CSPs and resolution servers have been removed from FIG. 9 to increase clarity, but are also employed by method 900.

When a new VXN (e.g. VXN100) is initiated at a CSP D in a datacenter D (e.g. in the second SP domain), a Register request is transmitted from CSP D to CRP Site D and a resolution server is queried in a manner similar to steps 801/807 and 803/809, respectively. The CRP Site D determines that new VXN100 coupled to CSP D is of global scope. At step 901, CRP Site D updates its local CCIB and transmits a Register request to CRP SP Z. The Register request indicates VXN100 is a global scope VXN with CRP Site D as the originating CRP and acting in the role of a CRP Site in a manner similar to steps 805/811. CRP SP Z determines that the VXN100 is of global scope and determines to forward the relevant information out of the second SP domain to determine if VXN100 is operational on any other SP domains (e.g. the first SP domain). At step 905, the CRP SP Z updates its local CCIB and forwards the Register request to the CRP IP cluster. The CRP IP cluster node receiving the Register request of step 905 may update its local CCIB and/or employ peer messaging to synchronize its CCIB with other nodes in the CRP IP cluster. The CRP IP cluster determines the network VXN100 only resides in the second SP domain and may take no further action. Alternatively, the CRP IP cluster my send an acknowledgment or a Report message to indicate VXN100 has been registered globally and only exists in the second SP network domain.

At a later time, a portion of VXN100 is initiated at datacenter A in the first SP domain. The CSP A sends a Register request to CRP Site A, which queries a resolution server to determine network scope, updates is local CCIB, and sends a Register request to CRP SP Y at step 907 in a manner similar to step 901. At step 911, the CRP SP Y updates its CCIB, determines that VXN100 is global, and forwards the Register request to the CRP IP cluster. Upon receiving the Register request of step 911 and/or upon employing peer messaging, the CRP IP cluster nodes become aware that VXN100 exists in both the first SP network domain and the second SP network domain. At steps 913 and 915, the CRP IP cluster transmits associated Report messages to CRP SP Z and CRP SP Y, respectively. The Report messages indicate VXN100 is reachable at both CSP A with CRP Site A acting as a CRP and at CSP D with CRP Site D acting as a CRP. As with method 800, steps 913 and 915 may be performed sequentially and/or substantially simultaneously. At steps 917 and 919, CRP SP Z updates its CCIB and sends the Report message to CRP Site D, while CRP SP Y updates its CCIB and sends the Report message to CRP Site A, respectively. CRP Site D and CRP Site A may then update their respective CCIBs and forward the Report message to CSP D and CSP A, respectively.

Upon completion of method 800, CSP A and CSP D may employ Post or similar messages to communicate directly (e.g. via tunneling or similar mechanisms) to allow a portion of VXN100 in datacenter A in the first SP network domain to communicate directly with a portion of VXN100 in datacenter B in the second SP network domain. From a user perspective, VXN100 may communicate as if part of the same network despite VXN100 being distributed across a plurality of SP networks across a plurality of geographically distant datacenters. As such, the Register requests and Report messages are transmitted, received, and processed to support direct communication over the VXN between SP network domains and data center network domains via the CSPs.

It should be noted that for methods 800 and 900, each CRP updates/builds its information base (e.g. CCIB) upon receiving the Register request and forwards the Register request upstream to the level of the VXN scope. Further, Report messages are triggered by receipt of a Register request and are forwarded downstream to all nodes (e.g. CRPs/CSPs) that are associated with the VXN indicated by the Register request. In addition, peer messaging at the CRP IP cluster may result in CCIB mismatches when Register requests for the same VXN arrive at different CRP IP nodes at substantially the same time. Theses mismatches may be mitigated by employing Atomicity, Consistency, Isolation, Durability (ACID) techniques by treating the CRP IP cluster as a clustered server with fully synchronized databases. Alternatively, the CRP IP cluster may be synchronized by forwarding/broadcasting each received Register request to all CRP IP nodes in the cluster. While some duplicate/intermediate reports may result, the CRP IP cluster eventually converges to a consistent set of CCIBs.

Figure 10:
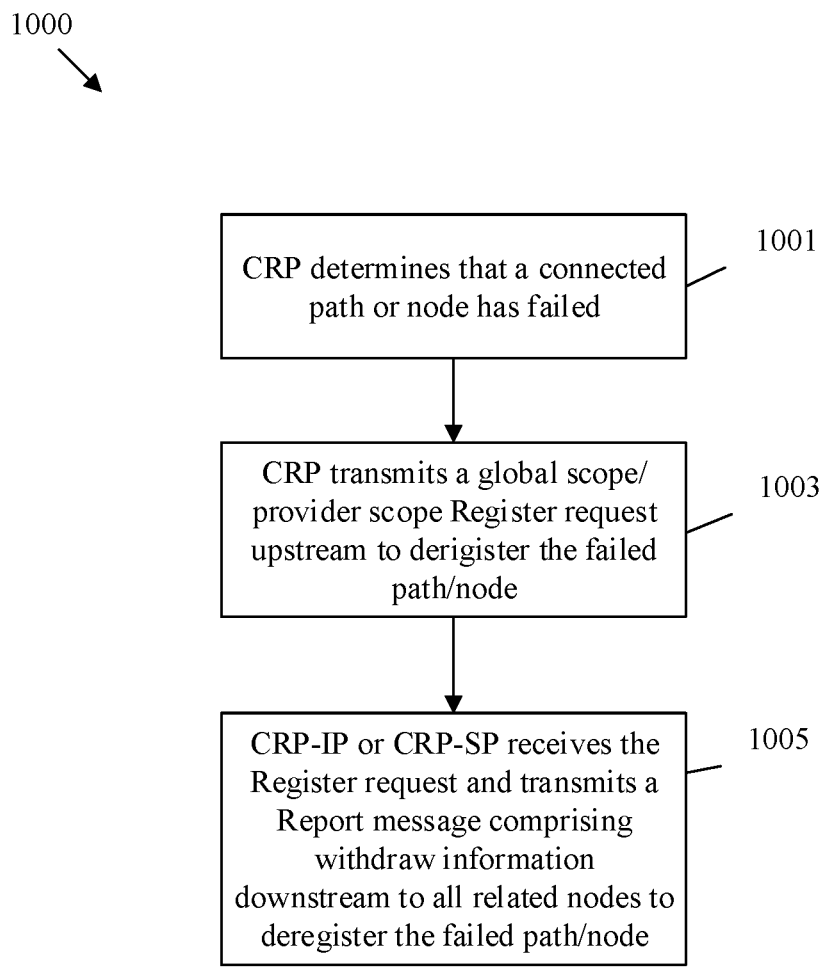
FIG. 10 is a flowchart of an embodiment of a method of error handling in a hierarchical Cloudcasting network.

FIG. 10 is a flowchart of an embodiment of a method 1000 of error handling in a hierarchical Cloudcasting network, such as hierarchical Cloudcasting networks 400, 600, 700, and control plane 300, and/or in an NE 500. Method 1000 is initiated when a path/node fails causing a portion of a VXN or CRP/CSP to become unreachable. At step 1001, a CRP (e.g. CRP IP, CRP SP, and/or CRP Site) determines that a connected path or node has failed. The CRP checks its CCIB to determine the scope(s) of the affected VXN(s). At step 1003, the CRP transmits a global scope/provider scope Register request, depending on the scopes of the affected networks. The Register requests are transmitted upstream as with the Register requests discussed above, but contain a Report withdraw TLV indicating the failed path/node should be deregistered (along with any VXNs exclusively reachable via the path/node). At step 1005, the Register request is forwarded to a CRP IP and/or CRP SP, depending on VXN scope. The CRP IP/CRP SP updates its CCIB and transmits a Report message comprising withdraw information downstream to all related nodes to deregister the failed path/node.

It should be noted that message delivery failure may be managed by base protocol error handling/reporting. Further, in the event of a role provisioning error, the CRP Site is configured to isolate the associated VXN from message leaks. As such, when role provisioning occurs, the VXN would only have access to VXN elements operating on the local datacenter.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in an inter-provider cloud rendezvous point (CRP-IP), the method comprising:
receiving, via a receiver of the CRP-IP, a Register request from a first service provider cloud rendezvous point (CRP-SP) in a first service provider (SP) network domain, the Register request indicating a first portion of a virtual extensible network (VXN) with a global scope is hosted by the first SP network domain; and
transmitting, via a transmitter of the CRP-IP, a Report message to a second CRP-SP in a second SP network domain hosting a second portion of the VXN, the Report message indicating the first portion of the VXN is hosted by the first SP network domain,
wherein the CRP-IP acts as a root node of a fixed cloud rendezvous point (CRP) hierarchy comprising the CRP-IP, the first CRP-SP as a first branch node, the second CRP-SP as a second branch node, and a plurality of site cloud rendezvous points (CRP Sites) as leaf nodes.

2. The method of claim 1, wherein the Register request comprises one or more type length values (TLVs) indicating a cloud rendezvous point (CRP) acting as a source of the Register request, a role of the CRP in the fixed CRP hierarchy, and a scope of the VXN.

3. The method of claim 1, wherein the Register request indicates a first site cloud rendezvous point (CRP Site) at a first data center in the first SP network domain, the first data center hosting the first portion of the VXN, wherein the Register request is received from the first CRP Site via the first CRP-SP.

4. The method of claim 3, wherein the Report message is transmitted via the second CRP-SP to a second CRP Site at a second data center in the second SP network domain, the second data center hosting the second portion of the VXN.

5. The method of claim 4, wherein the Report message indicates the first CRP-SP from the Register request to the second CRP-SP to support direct communications between a first Cloud Switch Point (CSP) at the first data center and a second CSP at the second data center to link the first portion of the VXN and the second portion of the VXN across a plurality of SP network domains.

6. A method implemented in a first site cloud rendezvous point (CRP Site) in a fixed cloud rendezvous point (CRP) hierarchy, the method comprising:
receiving, via a receiver of the first CRP Site, a first Register request from a first Cloud Switch Point (CSP) in a first data center domain, the first Register request indicating a first portion of a virtual extensible network (VXN) is hosted in the first data center domain;
querying, via a transmitter of the first CRP Site, a resolution server to determine a scope of the VXN; and
transmitting, via the transmitter, a second Register request to a service provider CRP (CRP-SP), the second Register request indicating the scope of the VXN and indicating the first CRP Site as an originator of the second Register request,
wherein the first CRP Site is incorporated into a fixed CRP hierarchy comprising an inter-provider CRP (CRP-IP) as a root node, the CRP-SP as a branch node, and the first CRP Site as one of a plurality of leaf nodes.

7. The method of claim 6, further comprising:
receiving a Report message indicating a second portion of the VXN is hosted in a second data center domain reachable by a second CSP managed by a second CRP Site; and
forwarding the Report message to the first CSP to support direct communication over the VXN via the first CSP and the second CSP.

8. The method of claim 7, wherein the second Register request indicates the scope of the VXN is global, and wherein the second CSP indicated by the Report message is operated by a different service provider network than the first CSP.

9. The method of claim 7, wherein the second Register request indicates the scope of the VXN is provider, and wherein the second CSP indicated by the Report message is operated by a common service provider network with the first CSP in a different data center network than the first CSP.

10. The method of claim 7, wherein the Report message comprises data indicating all CSPs associated with data centers hosting the VXN and all CRP Sites managing the indicated CSPs.

* * * * *